US007455803B2

(12) United States Patent
Sanger

(10) Patent No.: US 7,455,803 B2
(45) Date of Patent: Nov. 25, 2008

(54) WINDOW AND DOOR FORM FOR PREFABRICATED CONCRETE WALLS

(76) Inventor: Wallace D. Sanger, 11333 Acme Rd., Wellington, FL (US) 33414

( * ) Notice: Subject to any disclaimer, the term of this patent is extended or adjusted under 35 U.S.C. 154(b) by 308 days.

(21) Appl. No.: 10/369,351

(22) Filed: Feb. 18, 2003

(65) Prior Publication Data

US 2003/0222172 A1 Dec. 4, 2003

Related U.S. Application Data

(63) Continuation-in-part of application No. 09/777,053, filed on Feb. 5, 2001, now abandoned.

(51) Int. Cl.
*B29C 39/26* (2006.01)
*B29C 33/60* (2006.01)
*E04G 15/02* (2006.01)

(52) U.S. Cl. .......................... 264/334; 264/300; 249/39; 249/63

(58) Field of Classification Search ................... 249/35, 249/39, 63, 67, 68, 177; 264/299, 300, 334, 264/336
See application file for complete search history.

(56) References Cited

U.S. PATENT DOCUMENTS

| | | | | | |
|---|---|---|---|---|---|
| 1,863,549 | A | * | 6/1932 | Lockwood | 264/35 |
| 2,515,977 | A | * | 7/1950 | Banneyer | 249/39 |
| 2,557,631 | A | * | 6/1951 | Callan | 249/39 |
| 2,602,983 | A | * | 7/1952 | Troiel | 249/95 |
| 5,169,544 | A | * | 12/1992 | Stanfill et al. | 249/39 |
| 5,855,806 | A | * | 1/1999 | Caltrider | 249/39 |

* cited by examiner

*Primary Examiner*—Michael Safavi
(74) *Attorney, Agent, or Firm*—Frank L. Kubler

(57) ABSTRACT

A wall and port form for forming a concrete wall having a port for mounting a window or a door includes a building wall form having a wall form perimeter wall and a wall form bottom wall; a portal form for placement within the building wall form perimeter wall for defining an opening for one of a door and a window, the portal including a portal form perimeter wall configured as a closed loop encompassing a port space and preventing concrete poured into the wall form from flowing into the port space encompassed by the portal form, and a form spacing and dislodgement mechanism for spacing the portal form from the building wall form bottom wall upon curing of concrete within the wall form and thereby dislodging the portal form from the grip of the concrete.

14 Claims, 2 Drawing Sheets

WINDOW AND DOOR FORM FOR PREFABRICATED CONCRETE WALLS

FILING HISTORY

This application is a continuation-in-part of application Ser. No. 09/777,053 filed on Feb. 5, 2001, now abandoned.

BACKGROUND OF THE INVENTION

1. Field of the Invention

The present invention relates generally to the field of building construction from prefabricated building elements, such as prefabricated concrete building walls and modules. More specifically the present invention relates to a portal form for placement within the wall form perimeter wall of a building wall form, to define an opening in the resulting concrete wall for mounting a window or a door. The portal form includes a portal form perimeter wall configured as a closed loop which is preferably either square or rectangular and prevents concrete poured into the wall form from flowing into the space encompassed by the portal form, and includes form spacing and dislodgement screw structures including spacing screws which are rotated after the wall concrete cures, to space the portal form from the wall form bottom wall and thereby dislodge the portal form from the grip of the cured concrete. The portal form perimeter wall has a wall upper edge and a wall lower edge and either the entire portal form perimeter wall, or only its outer surface is tapered inwardly from the wall upper edge to the wall lower edge for greater ease in dislodging and removing the portal form from the cured wall concrete. The portal form perimeter wall or its outer face is preferably stepped to define window and door mounting in the resulting door or window opening.

2. Description of the Prior Art

There have long been forms for receiving uncured concrete to create a pre-fabricated concrete wall. Interior forms have been provided for forming windows and door openings. Yet interior forms have either been very difficult to remove from the cured wall or have necessarily remained as part of the cured wall.

Callan, U.S. Pat. No. 2,557,631, issued on Jun. 19, 1951, discloses a collapsible form for forming window or door openings in concrete walls. The Callan portal form is fragmented into form segments and includes a dislodgement mechanism which pulls the form segments inwardly toward the center of the portal form, but does not space the portal form from the wall form bottom wall. Callan is complex and as a result would be expensive to manufacture and subject to mechanical failure.

It is thus an object of the present invention to provide a window and door portal form for placement within a concrete wall form for defining an opening in the cured concrete wall for placement of a window or a door.

It is another object of the present invention to provide such a portal form which includes means for progressively, evenly and reliably dislodging the portal form from the cured concrete wall.

It is still another object of the present invention to provide such a portal form which can be used again and again.

It is finally an object of the present invention to provide such a portal form which inexpensive to manufacture, durable, removably with a common tool such as an air wrench by a workman of ordinary skill.

SUMMARY OF THE INVENTION

The present invention accomplishes the above-stated objectives, as well as others, as may be determined by a fair reading and interpretation of the entire specification.

A wall and port form is provided for forming a concrete wall having a port for mounting a window or a door, including a building wall form having a wall form perimeter wall and a wall form bottom wall; a portal form for placement within the building wall form perimeter wall for defining an opening for one of a door and a window, the portal including a portal form perimeter wall configured as a closed loop encompassing a port space and preventing concrete poured into the wall form from flowing into the port space encompassed by the portal form, and a form spacing and dislodgement mechanism for spacing the portal form from the wall form bottom wall, which in most cases would thereby space the portal form from the building wall form bottom wall, upon curing of concrete within the wall form and thereby dislodge or break the portal form free from the grip of the cured wall concrete.

The portal form preferably has interior corners and the form spacing and dislodgement mechanism preferably includes screw retaining plates extending across each interior corner of the portal form perimeter wall, each retaining plate having an internally threaded screw bore and a spacing screw engagingly screwed through each screw bore, and each spacing screw preferably is of sufficient length that rotating the screws a certain number of turns causes each screw to bear against the bottom wall and cause a resultant upward force on the portal form, dislodging the portal form from cured wall concrete in the wall form and spacing the portal form.

The portal form perimeter wall preferably is one of substantially square and substantially rectangular. The portal form perimeter wall has a wall upper edge and a wall lower edge and has a wall outer face which is tapered inwardly from the wall upper edge to the wall lower edge for lower resistance dislodgement. The portal form perimeter wall outer face is stepped to define window and door mounting steps in the resulting port in the formed concrete wall. The outer face of the portal form perimeter wall is covered with an adhesion-resistant coating prior to pouring concrete into the wall form.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
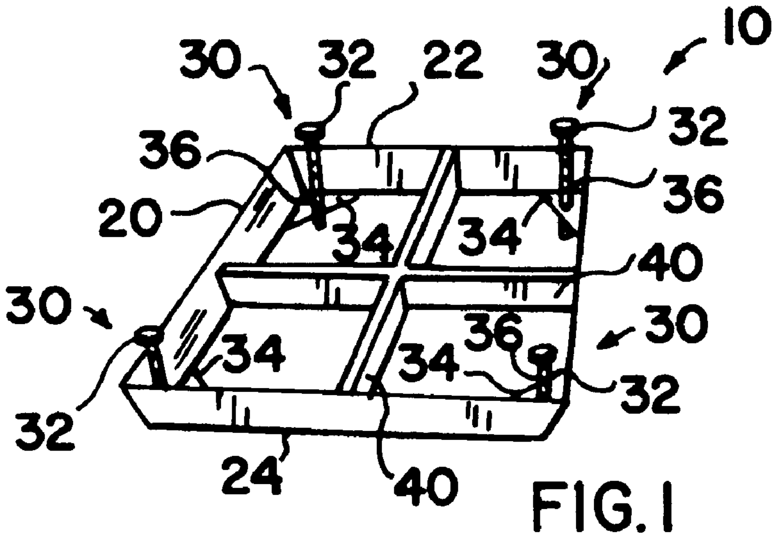
FIG. 1 is a perspective top view of the preferred portal form.
Figure 2:
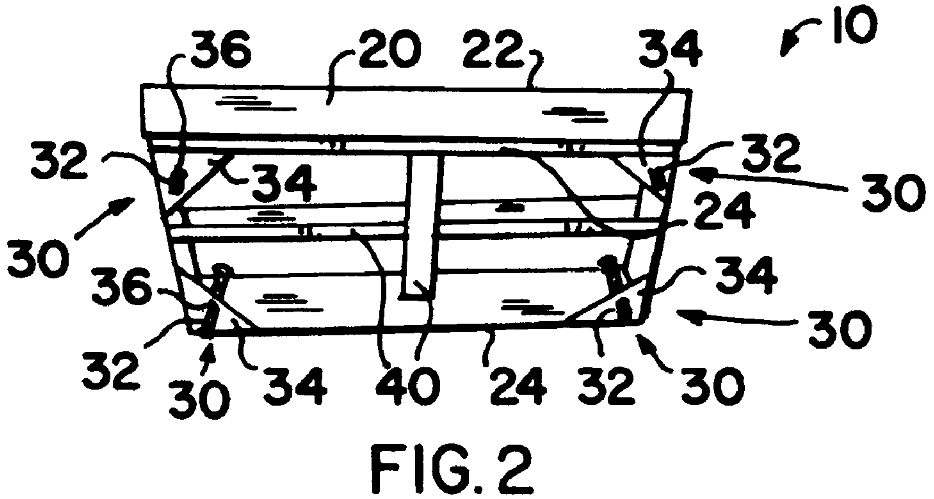
FIG. 2 is a perspective bottom view of the portal form of FIG. 1.
Figure 3:
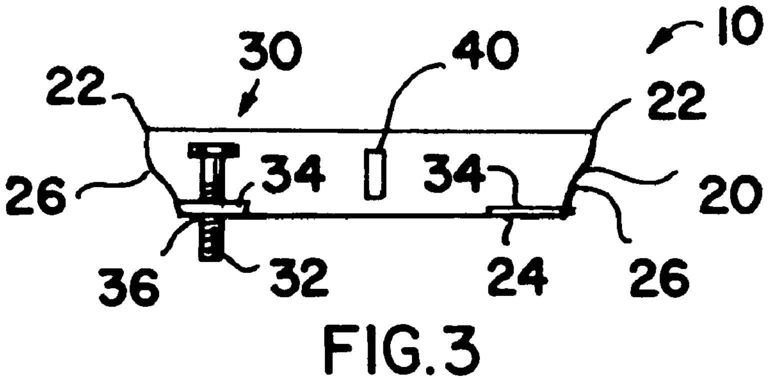
FIG. 3 is a cross-sectional side view of the portal form of FIGS. 1 and 2.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 4:
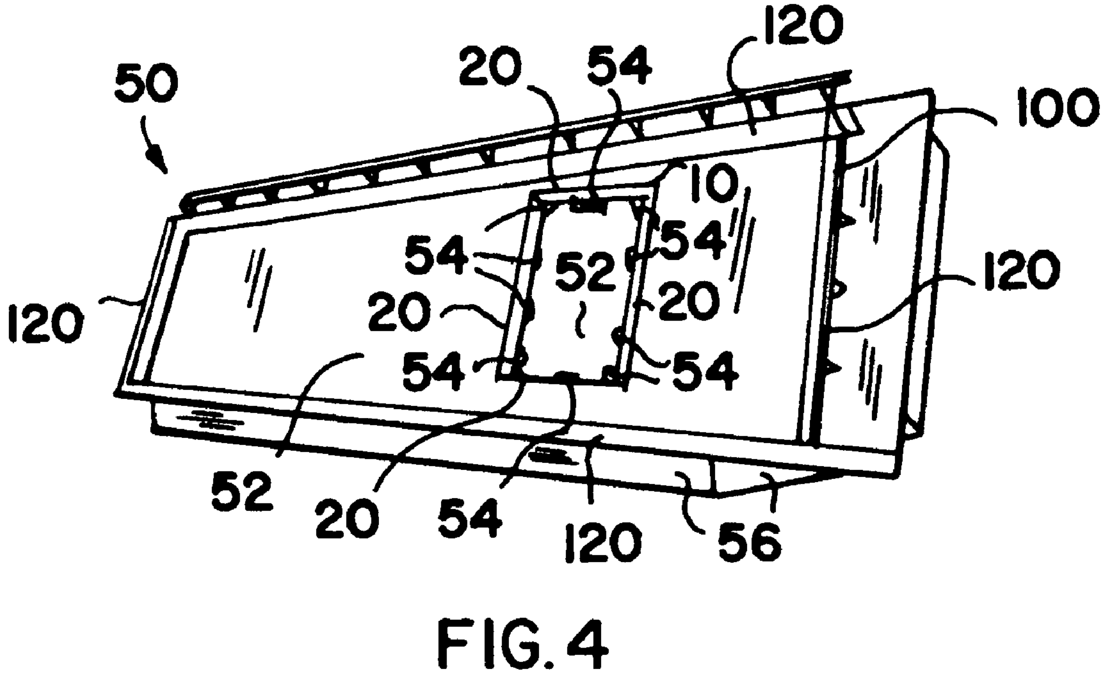
FIG. 4 is a front perspective view of a wall form incorporating a tilting table with a portal form shown in broken lines.
Figure 5:
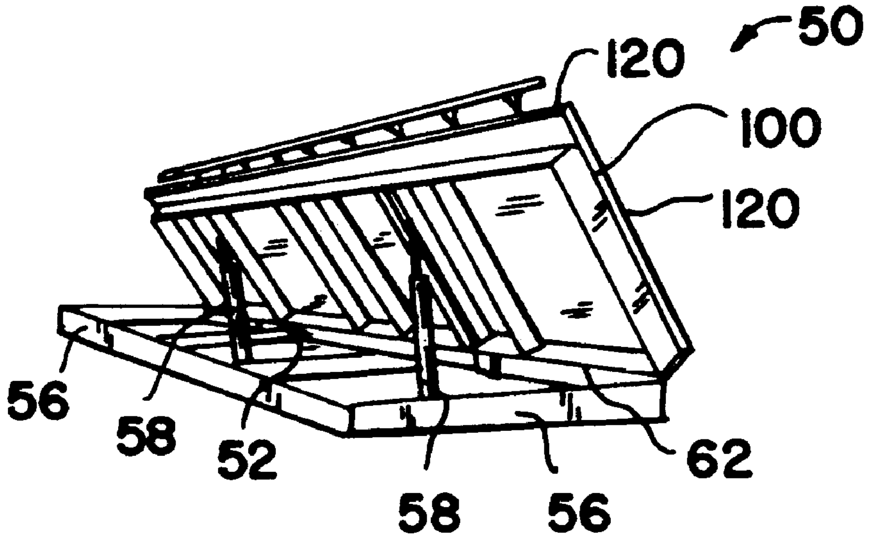
FIG. 5 is a rear perspective view of the tilting table and thus of the wall form of FIG. 4.

Referring to FIGS. 1-5, and specifically to FIGS. 4 and 5, a portal form 10 is shown placed within a building wall form 100 on a forming surface, the forming surface preferably being a tilting table 50 elevated on hinges 62 from a horizontal frame 56 by hydraulic cylinders 58. The building wall form 100 has a wall form perimeter wall 120 and a wall form bottom wall 52 preferably defined by the tilting table 50 upper surface. The portal form 10 within the building wall form 100 functions to define an opening in the resulting cured wall for the mounting of a window or a door.

Portal form 10 includes a portal form perimeter wall 20 configured as a closed loop which is preferably either square or rectangular and prevents concrete poured into the wall form 100 from flowing into the port spaces encompassed by the portal form 10. See FIGS. 1-3. Portal form perimeter wall 20 is preferably fitted around metal abutment blocks 54 welded to the wall form bottom wall 52 and thus to tilting table 50 upper surface. See FIG. 4. Portal form 10 includes form spacing and dislodgement screw structures 30 including spacing screws 32 which are rotated after the wall concrete cures, to space portal form 10 from the building wall form bottom wall 52 and thereby dislodge the portal form 10 and thus break the portal form free from the grip of the cured wall concrete.

The portal form perimeter wall 20 has a wall upper edge 22 and a wall lower edge 24 and either the entire portal form perimeter wall 20 or only its outer surface is tapered inwardly from the wall upper edge 22 to the wall lower edge 24 for greater ease in dislodging and removing the portal form from the cured wall concrete. The portal form perimeter wall 20 or its outer face is preferably stepped to define window and door mounting step 26 in the resulting door or window opening.

As indicated above, a key inventive feature of the portal form 10 is the spacing and dislodgement screw structures 30 which include screw retaining plates 34 which preferably extend across each interior corner of the portal form perimeter wall 20. Each retaining plate 34 has a screw bore 36 which is internally threaded and a spacing screw 32 or bolt which is engagingly screwed through the screw bore 36. The spacing screw 32 is of sufficient length that rotating the spacing screw 32 a certain number of turns causes the spacing screw 32 to bear against the wall form bottom wall 52 of the wall form 100 and cause a resultant upward force on the portal form 10 which dislodges the portal form 10 from the cured wall concrete and spaces the portal form 10 from the wall form bottom wall 52. The spacing screws 32 preferably have bolt heads of conventional configuration which are rotated by a wrench, and preferably by an air wrench. It is preferred that the outer face of the portal form perimeter wall 20 be covered with an adhesion-resistant coating before concrete is poured into the wall form 100. It is also contemplated that the portal form 10 be used in the very same way in a concrete building module form 100. Structural cross-members 40 reinforce portal form 10.

Method

In practicing the invention the following method may be used. A method of forming a concrete wall in a wall form 100 having a wall form perimeter wall 120 and a wall form bottom wall 52 with a portal formed with a portal form 10 including a portal form perimeter wall 20 and portal spacing and dislodgement means 30 secured relative to the portal form perimeter wall 20 and positioned within the wall form 100, and of dislodging the portal form 10 from cured concrete within the wall form 100, the method including the steps of: pouring uncured concrete into the wall form 100 outside the portal form 10; permitting the concrete to cure within the wall form 100; and operating the portal form spacing and dislodgement means 30 to space the portal form 10 from the wall form bottom wall 52, thereby dislodging the portal form 10 from the cured concrete within the wall form 100. An additional method step is that of lifting the portal form 10 out of the wall form 100, either manually or by other means.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A method of forming a concrete wall having a portal, in a wall form having a wall form perimeter wall and a wall form bottom wall with a portal formed with a portal form comprising a portal form perimeter wall and portal spacing and dislodgement means secured relative to the portal form perimeter wall and positioned within the wall form, and of dislodging the portal form from cured concrete within the wall form, the method comprising the steps of:

placing uncured concrete into the wall form outside the portal form;

permitting the concrete to cure within the wall form;

and operating the portal form spacing and dislodgement means to space the portal form from the wall form bottom wall, thereby dislodging the portal form from the concrete within the wall form.

2. The method of claim 1, comprising the additional step of:

lifting the portal form out of the wall form.

3. A wall and port form for forming a concrete wall having a port for mounting a window or a door, comprising:

a building wall form having a wall form perimeter wall and a wall form bottom wall;

a portal form for placement within said building wall form perimeter wall for defining an opening for one of a door and a window, said portal form comprising a portal form perimeter wall configured as a closed loop encompassing a port space and preventing concrete poured into said wall form from flowing into the port space encompassed by said portal form, and form spacing and dislodgement means for spacing said portal form from said wall form bottom wall upon curing of concrete within said wall form and thereby dislodging said portal form from the grip of the cured wall concrete.

4. The wall and port form of claim 3, wherein said portal form perimeter wall is one of substantially square and substantially rectangular.

5. The wall and port form of claim 3, wherein said portal form perimeter wall has a wall upper edge and a wall lower edge and has a wall outer face which is tapered inwardly from said wall upper edge to said wall lower edge for lower resistance dislodgement.

6. The wall and port form of claim 3, wherein said portal form perimeter wall outer face is stepped to define window and door mounting steps in the resulting port in the formed concrete wall.

7. The wall and port form of claim 3, wherein said outer face of said portal form perimeter wall is covered with an adhesion-resistant coating prior to pouring concrete into said wall form.

8. A wall and port form for forming a concrete wall having a port for mounting a window or a door, comprising:

a building wall form having a wall form perimeter wall and a wall form bottom wall;

a portal form for placement within said building wall form perimeter wall for defining an opening for one of a door and a window, said portal form comprising a portal form perimeter wall configured as a closed loop encompassing a port space and having interior corners and preventing concrete poured into said wall form from flowing into the port space encompassed by said portal form;

and form spacing and dislodgement means for spacing said portal form from said wall form bottom wall upon curing of concrete within said wall form and thereby dislodging said Portal form from the grip of the cured wall concrete, said form spacing and dislodgement means comprising screw retaining plates extending across each interior corner of said portal form perimeter wall, each said retaining plate having an internally threaded screw bore and a spacing screw engagingly screwed through each said screw bore, and wherein each said spacing screw is of sufficient length that rotating said screws a certain number of turns causes each said screw to bear against said wall form bottom wall and cause a resultant upward force on said portal form, dislodging said portal form from cured wall concrete in said wall form and spacing said portal form.

9. The wall and port form of claim 8, wherein said portal form perimeter wall is one of substantially square and substantially rectangular.

10. The wall and port form of claim 8, wherein said portal form perimeter wall has a wall upper edge and a wall lower edge and has a wall outer face which is tapered inwardly from said wall upper edge to said wall lower edge for lower resistance dislodgement.

11. The wall and port form of claim 8, wherein said portal form perimeter wall outer face is stepped to define window and door mounting steps in the resulting port in the formed concrete wall.

12. The wall and port form of claim 8, wherein said outer face of said portal form perimeter wall is covered with an adhesion-resistant coating prior to pouring concrete into said wall form.

13. A wall and port form for forming a concrete wall having a port for mounting a window or a door, comprising:

a building wall form having a wall form perimeter wall and a wall form bottom wall;

a portal form for placement within said building wall form perimeter wall for defining an opening for one of a door and a window, said portal form comprising a portal form perimeter wall configured as a closed loop encompassing a port space and preventing concrete poured into said building wall form from flowing into the port space encompassed by said portal form;

said portal form perimeter wall comprising portal form spacing and dislodgement means for spacing said portal form from said wall form bottom wall upon curing of concrete within said building wall form and thereby freeing said portal form from the grip of the concrete within said building wall form, said form spacing and dislodgement means comprising screw retaining means having an internally threaded screw bore and an spacing screw engagingly screwed through said screw bore, and wherein said spacing screw is of sufficient length that rotating said screw a certain number of turns causes said screw to bear against said wall form bottom wall and cause a resultant upward force on said portal form, dislodging said portal form from cured wall concrete in said building wall form and spacing said portal form relative to said building wall form and to the cured wall concrete.

14. A wall and port form for forming a concrete wall having a port for mounting a window or a door, comprising:

a building wall form having a wall form perimeter wall and a wall form bottom wall;

a portal form for placement within said building wall form perimeter wall for defining an opening for one of a door and a window, said portal form comprising a portal form perimeter wall configured as a closed loop encompassing a port space and preventing concrete poured into said building wall form from flowing into the port space encompassed by said portal form, and portal form dislodgement means comprising a spacing member retaining structure connected to said portal form, and a spacing member retained by and movable relative to said spacing member retaining structure away from said wall form bottom wall and toward said wall form bottom wall such that said spacing member bears against said wall form bottom wall and causes a resultant force on said portal form away from said wall form bottom wall, dislodging said portal form from cured wall concrete in said building wall form.

* * * * *